United States Patent [19]

Seitz et al.

[11] Patent Number: 4,527,221
[45] Date of Patent: Jul. 2, 1985

[54] SUPPORT ASSEMBLY FOR A HIGH VOLTAGE DC POWER SUPPLY

[75] Inventors: James P. Seitz, Burlington; Rodger A. Zara, Mt. Holly, both of N.J.

[73] Assignee: NWL Transformers, Bordentown, N.J.

[21] Appl. No.: 536,193

[22] Filed: Sep. 27, 1983

[51] Int. Cl.³ ............................................. H05K 7/20
[52] U.S. Cl. .................... 361/379; 363/141; 361/385; 307/150; 174/15 R
[58] Field of Search ............... 361/331, 334, 335, 346, 361/356, 358, 363, 379, 380–382, 385, 390, 391, 395, 399, 417, 419, 420, 332, 407; 307/149, 150, 156; 174/15 R; 363/141, 144, 146

[56] References Cited

U.S. PATENT DOCUMENTS

| | | | |
|---|---|---|---|
| 3,226,602 | 12/1965 | Elfving | 174/16 HS |
| 3,249,817 | 5/1966 | Sinclair | 361/385 |
| 3,523,214 | 8/1970 | Beniaminson | 361/429 |
| 3,564,386 | 2/1971 | Leonard | 361/385 |
| 3,571,771 | 3/1971 | Stephanson | 361/334 |
| 3,600,636 | 8/1971 | Petersen | 361/385 |
| 3,713,060 | 1/1973 | Harlow | 174/15 R |
| 3,792,338 | 2/1974 | Barthelemy | 361/385 |
| 3,858,090 | 12/1974 | Lehmann | 174/15 R |
| 3,898,537 | 8/1975 | Mayse | 361/429 |
| 4,091,439 | 5/1978 | Blair, Jr. | 361/385 |
| 4,200,909 | 4/1980 | Milum | 361/331 |
| 4,429,347 | 1/1984 | Seitz | 361/379 |

*Primary Examiner*—G. P. Tolin
*Attorney, Agent, or Firm*—Ratner & Prestia

[57] ABSTRACT

A high voltage DC power supply has a transformer rigidly mounted within a tank containing fluid and a support assembly, which houses various electrical components, detachably mounted therein. The support assembly, which forms a ladder-type arrangement, is held in a vertical position and at a distance away from any wall within the tank. A flexible strap containing plugs connects to mating sockets on the support assembly for electrically coupling the transformer to the electrical components housed in the support assembly.

11 Claims, 5 Drawing Figures

SUPPORT ASSEMBLY FOR A HIGH VOLTAGE DC POWER SUPPLY

FIELD OF THE INVENTION

This invention relates generally to high voltage DC power supplies and, more specifically, to an easily removable support assembly for housing electrical components.

BACKGROUND ART

High voltage DC power supplies have been limited in the manner in which the various electrical components have been supported within the unit. The unit consisted of a covered enclosure or tank which contained an oil immersed transformer and associated electrical components. When it came time to service or repair the unit, the entire transformer as well as its associated electrical components had to be removed from the tank. This has been an expensive and time consuming task for even the most minor of electrical failures, since heavy equipment lifts were usually required each time.

Examples of such construction wherein the transformer and other electrical components were undesirably mounted to the same frame were disclosed in U.S. Pat. Nos. 3,792,338; 3,858,090; and 3,898,537. In these systems, when it came time to repair the power supply, the transformer and the other electrical components had to be removed as a single unit.

For example in U.S. Pat. No. 3,898,537, there is shown a transformer which is mounted upon the base of a rack. Although the rack is shown to contain several modules housing electrical components to permit easier installation and repair, it is nevertheless deficient in that the lowest module in the rack has been sized to contain the transformer, thus making the rack bulky and heavy. Upon repair the entire rack-transformer and modules had to be removed.

In order to facilitate servicing of the electrical components within the unit without necessitating removal of the transformer, various improvements have been made to the high voltage power supplies. One such improvement is disclosed in U.S. Pat. No. 3,249,817 in which the electrical components are shown readily accessible from outside of the tank by the removal of a side cover plate. Another improvement was disclosed in U.S. Pat. No. 3,600,636 wherein electrical components are shown completely outside the tank and the transformer is shown residing within the tank. In U.S. Pat. No. 4,091,439, the electrical components are shown mounted within a hollow compartment of a movable cover. In this manner, it is possible to access the electrical components upon removal of the cover, without removal of the transformer.

In U.S. Pat. No. 4,200,909, electrical components are shown mounted in predetermined positions within one compartment of an enclosure and a transformer is shown mounted within a second compartment of the enclosure. This arrangement permits components to be individually installed or removed for repair.

SUMMARY OF THE INVENTION

A high voltage DC power supply has a transformer rigidly mounted within a tank containing fluid and a support assembly detachably mounted therein. The support assembly consists of several horizontal struts. The combination of horizontal struts and vertical tubular supports form a ladder-type arrangement. The support assembly is detachably secured within the tank in a vertical position and at a distance away from any wall within the tank. A flexible strap connects to a mating connector on the support assembly for electrically coupling the transformer thereto.

DESCRIPTION OF THE PREFERRED EMBODIMENT

Figure 1:
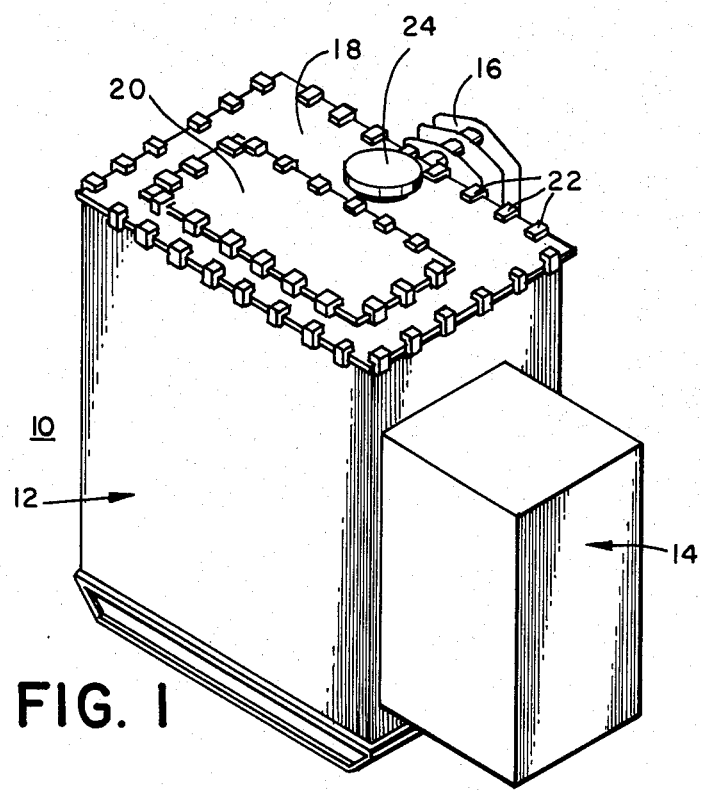
FIG. 1 is a perspective view of a high voltage DC power supply embodying the present invention.

Referring to FIGS. 1-5 there is shown a high voltage DC power supply 10 which, for example, fulfills, for example the electrical requirements in the broadcast industry for powering a Klystron tube. Power supply 10 comprises a tank 12 which houses transformer 26 and support assembly 40.

There are two covers for tank 12. Specifically, an inner cover 20 which when removed exposes support assembly 40 and portions of transformer 26. A main cover 18, which surrounds inner cover 20, when removed exposes the remainder of tank 12 including the remaining portions of transformer 26. A plurality of clamps 22 are positioned, spaced apart from each other, near the top of the side walls of the tank and near the outer perimeter of cover 20. Each of the clamps are bolted to U-shaped metal sleeves in order to hold covers 18 and 20 in place for the purposes of providing both a pressure/vacuum and weather seal.

It will be understood that fluid surrounds all of the internal components of the tank for purposes of cooling. The fluid is either oxidation resistant oil or a silicone fluid (dimethyl silicone). A valve 24 projecting through cover 18 is provided for tank 12 for purposes of pressure relief.

Figure 2:
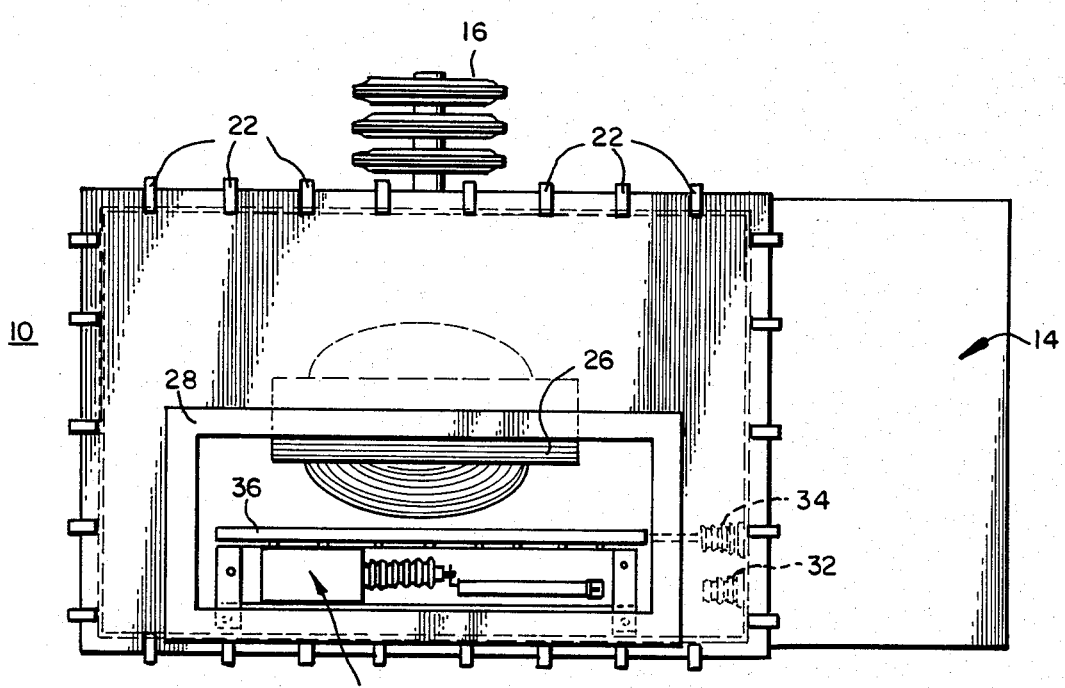
FIG. 2 is a plan view of the high voltage DC power supply with a cover removed showing the support assembly within.

Bolted to the floor at the bottom of the tank is transformer 26 which is positioned as shown in FIG. 2. It will be understood that the purpose of transformer 26 is to increase the voltage from a low voltage supply to a high voltage required for a Klystron, for example.

Figure 3:
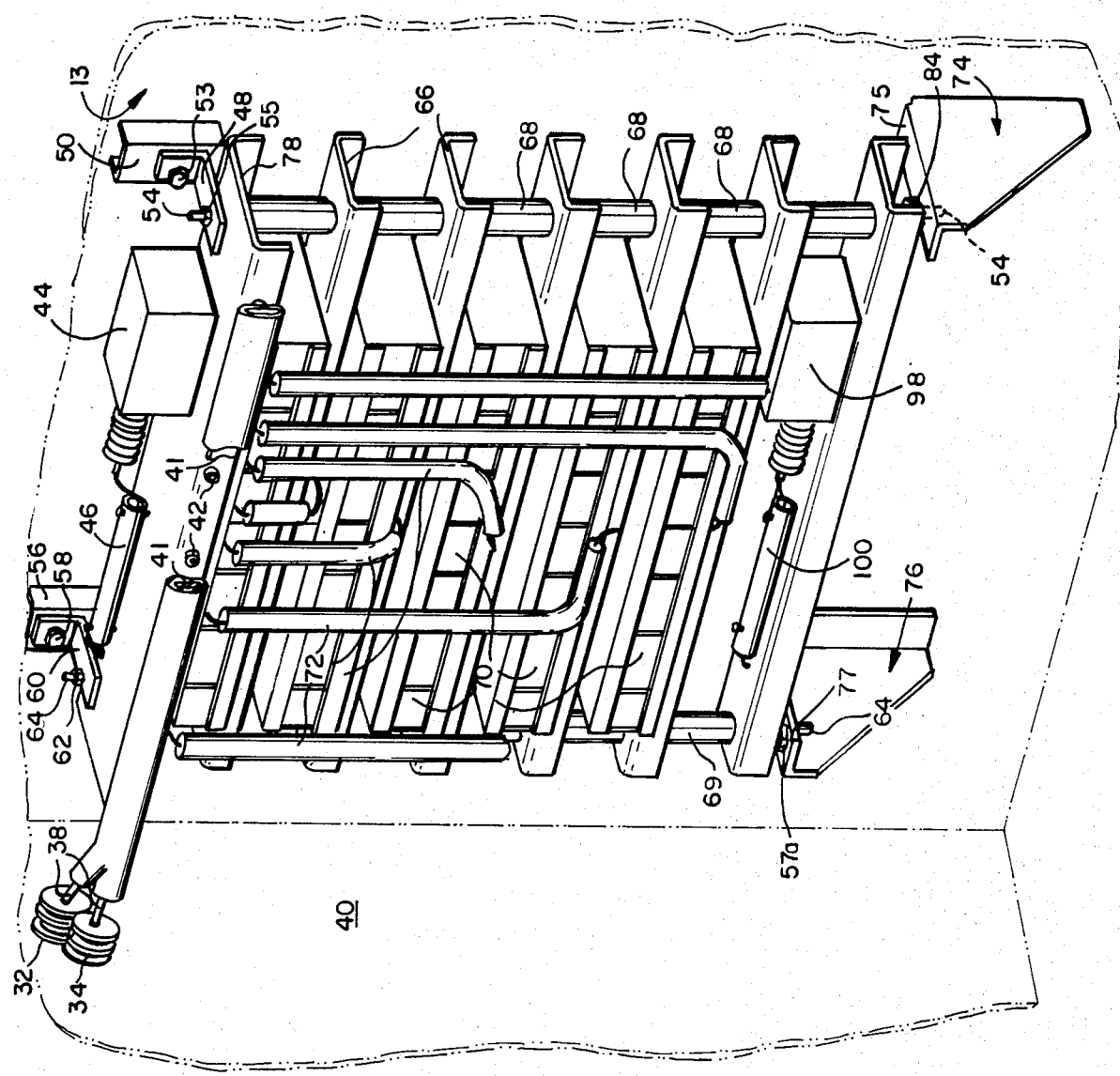
FIG. 3 is a perspective view of the support assembly mounted on a wall of the high voltage DC power supply with the remaining walls cut away.
Figure 4:
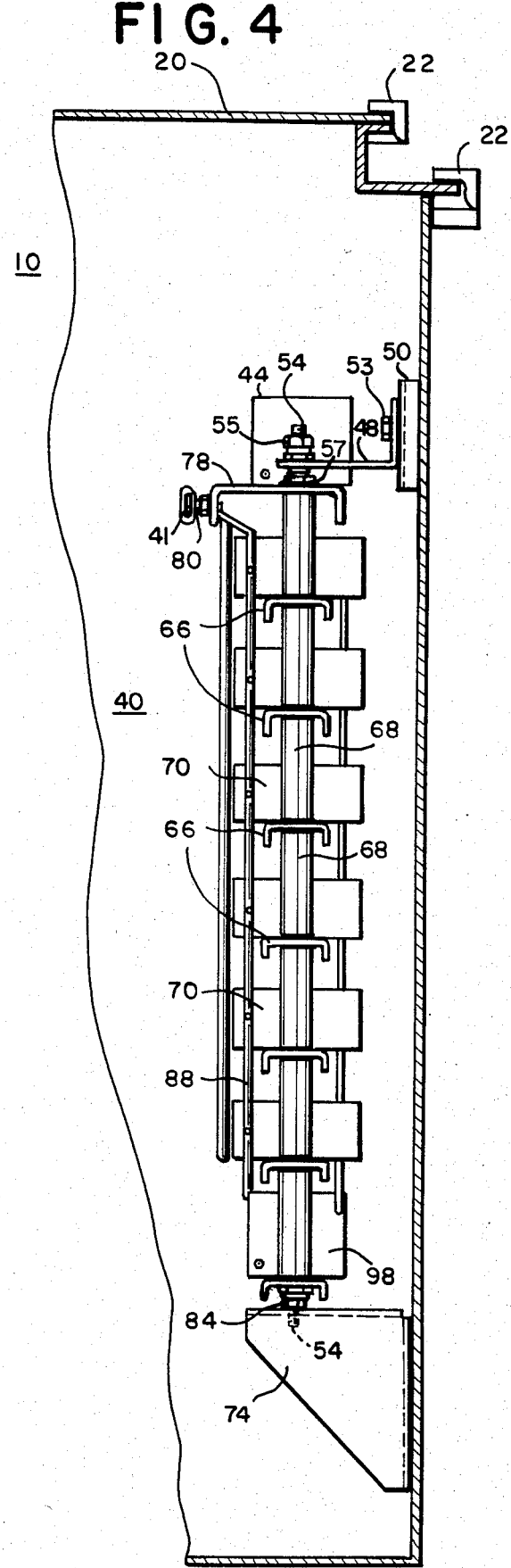
FIG. 4 is a side view of the support assembly mounted on a wall of the high voltage DC power supply.

As best shown in FIGS. 3 and 4, support assembly 40 is mounted onto side wall 13 of tank 12 by way of four mounting brackets, to be described later. In general, support assembly 40 is vertically oriented and disposed away from side wall 13 by a fixed space relationship. In this manner, the support assembly is completely immersed in cooling fluid and is surrounded by a uniform temperature.

The support assembly is comprised of a first plurality of vertical tubular supports 68 and a second plurality of vertical tubular supports 69. Tubular supports 68 and 69 are respectively situated at opposite ends of support assembly 40 and are disposed substantially parallel to and at a distance from oppositely disposed side walls of tank 12.

Lying above and being supported by each oppositely disposed pair of tubular supports 68 and 69 is one strut 66. Each strut comprises an inverted U-shaped step, electrically insulated beam forming a horizontal shelf or rack adapted for holding one unit 70, the latter housing various electrical components, such as diodes and filter capacitors. It will be understood that each unit 70 may be held in place on its respective strut by means of suitable fasteners.

Figure 5:
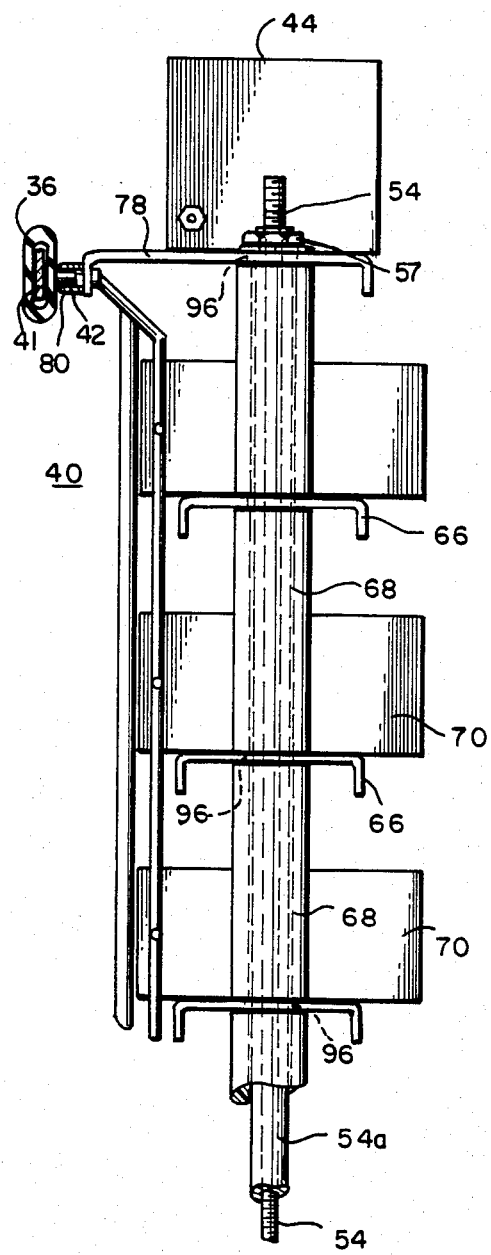
FIG. 5 is an enlarged, fragmentary side view of the support assembly shown in FIG. 4.

As may best be seen in FIGS. 4 and 5, all struts 66 have a similar U-shaped configuration with a horizontal shelf of predetermined width. The uppermost shelf, however, namely strut 78, forms a U-shaped configuration with a horizontal shelf of substantially greater width as compared to the width of struts 66. As shown, strut 78 is adapted to receive electrical components which may not readily fit within housing units 70. Such components may be, for example, as shown in FIG. 3, a capacitor 44 and a resistor 46. These components may be held in place in any conventional manner.

In the example shown in FIG. 3, the lowest strut 66 is also adapted to receive electrical components which may not fit within housing units 70. As shown, these components are a capacitor 98 and a resistor 100. These components may be fixed into position in a manner similar to that of the components residing in the upper strut.

Each of the struts is provided with a pair of holes 96, as shown in FIG. 5, which are spaced adjacent opposite ends and in alignment with tubular supports 68 and 69, respectively. Holes 96 have a diameter smaller than that of the outer diameter of supports 68, 69 and thus the supports do not extend through the struts. Aluminum pipes or tubes 54a are disposed as metal guides within the inner bores of supports 68, 69 respectively. Threaded rods 54, 64 are respectively inserted within pipes 54a and threadedly engage locking ring pairs 57, 84 and 57a.

In this manner, lock rings 57, 84 and 57a clamp supports 68, 69 together against the struts and all are held together by the aluminum pipes. Thus, support assembly 40 forms a rigid support for housing the various electrical components, but may still be easily disassembled for repair purposes when necessary.

The support assembly may also be likened to a ladder, wherein vertical tubular supports 68 and 69 form the two pillars of the ladder and the horizontal struts form the rungs of the ladder. The number of rungs, or horizontal struts, it will be understood, is dependent on the power supply's application. For example, in the embodiment shown in FIG. 3, five struts are necessary to house five individual units 70 and two struts are necessary to hold some discrete electrical components. Other applications may require more or less struts.

The manner in which support assembly 40 is detachably mounted to back wall 13 of tank 12 will now be described. Two brackets 74 and 76, as shown in FIG. 3, are permanently welded to back wall 13. At the top of each bracket a horizontal flange is provided to respectively form shelf 75 and shelf 77. Both shelves are affixed at predetermined positions above the floor of tank 12 in such a way as to form an imaginary horizontal surface upon extending shelf 75 and shelf 77 towards each other. Moreover, the shelves are spaced apart from each other in such a way as to be effective in supporting tubular supports 68 and 69.

In order to detachably mount support assembly 40 upon shelves 75 and 77, holes are provided on the shelves for receiving rod 54 and rod 64. The holes are smaller in diameter than the outer diameter of supports 66, 68. The ends of the rods protrude through and below the horizontal flanges and thus the shelves are effective to laterally secure supporting assembly 40. Moreover, the holes are positioned on the shelves at a predetermined distance from back wall 13 so that the entire structure of assembly 40 is removed from said wall. This latter feature, it will be understood, is effective in providing uniform cooling by permitting the cooling fluid to easily flow around assembly 40.

In this manner, shelves 75 and 77 are effective in supporting asssembly 40. It will be understood, of course, that the shelves bear the entire weight of the structure and, consequently, must be strong enough to bear such load.

In order to prevent supporting assembly 40 from pivoting away from a vertical position, two additional brackets 50 and 56 and respective L shaped straps 48, 60 are provided. Brackets 50, 56 are permanently welded to back wall 13 and straps 48, 60 are in horizontal alignment with the top surface of upper strut 78. As shown in FIG. 3, upper brackets 50 and 56 are positioned on back wall 13 so as to be in vertical alignment with lower brackets 74 and 76, respectively.

Connecting supporting assembly 40 to brackets 50 and 56 are slotted metallic straps or brackets 48 and 60. Each metallic strap has two holes positioned so that a first hole receives threaded lugs 53, 58 respectively and a second hole receives the respective upper ends of rods 54, 64. Compression fitting nuts 55, 62 having compressible bushings threadedly engage the upper ends of rods 54, 64 above straps 48, 60 to secure assembly 40 in place. Straps 48, 60 are slotted with respect to lugs 53, 58 so that they may be slid upwardly when nuts 55, 62 are removed.

The two holes for rods 54, 64 are spaced apart on each metallic strap at a predetermined position, so as to assume a zero moment-arm along rods 54 and 64. Thus, support assembly 40 is vertically positioned with its entire weight bearing down on bottom brackets 74 and 76.

It will be understood that tubular supports 68 and 69 may be made from Fiberglas or other nonconducting material. Similarly, struts 66 and 78 may also be made from Fiberglas or other strong, nonconducting material.

Units 70 which house the various electrical components are electricaly insulated from one another. Where necessary, various components may be electrically connected with copper wires inserted through Teflon sleevings 72, as shown in FIG. 3. Teflon sleevings 72 are effective in insulating the wires from the rest of support assembly 40. The sleevings also add rigidity to the wires as to prevent tension and shear forces acting upon them during shipment.

The entire support assembly 40 may be constructed apart from the actual location of tank 12 and transformer 26. The components may be assembled and housed in units 70 at a conventional electrical assembly area located away from the site of tank 12. Components 44, 98 or 100 may also be completely constructed elsewhere. All the components and units 70 may then be brought together and simply bolted to struts 66 and 78. Next, the struts may be detachably secured together with tubular supports 68 and 69, pipes 54a and 64a, rods 54 and 64 and the locking rings to form assembly 40. Finally, the necessary electrical connections among the components may then be made with the aid of copper wires and Teflon sleevings. The completed support assembly 40 may be brought to the side of tank 12 and installed independently of transformer 26. Installation is simple, since support assembly 40 needs only to be lowered with rods 54 and 64 engaging shelves 75 and 77, respectively. Lugs 53, 58 are loosened, brackets 48, 60 are moved upwardly and turned so that assembly 40 may be positioned in place. Brackets 48, 60 are then moved to engage the rods, lugs 53, 58 are tightened and nuts 55, 62 are positioned in place.

Support assembly 40 is not only physically rigged to transformer 26, but is only electrically connected to it in a manner which will now be described. All required electrical connections are made by way of a common bus, or fanning strip 36. As shown in FIG. 5, fanning strip 36 is comprised of an insulated, horizontal, flexible strap spanning across the longitudinal dimension of upper-strut 78. Within the strap, which may be made of an insulating sleeving such as Fiberglas, are a plurality of electrical conductors 38 which are insulated from one another and generally oriented in a direction parallel to the length of fanning strip 36. Electrical conductors 38 form a cluster of conductors which are diagramatically shown in FIG. 5 as a center cluster 41.

Each electrical conductor 38 is brought out from fanning strip 36 by way of a banana plug 80, shown in FIG. 5. The banana plugs are spaced apart from each other at predetermined distances along the length of fanning strip 36 and are oriented in a direction perpendicular to the length of the fanning strip.

Banana plugs 80 are received in complementary mating sockets 42. As shown, sockets 42 are located colinearly along the length of upper strut 78 and are spaced in juxtaposition to banana plugs 80. Thus, fanning strip 36 having banana plugs 80 may be easily mated with sockets 42. It will be understood that due to the flexibility of fanning strip 36, manual pressure may be applied at individual points along the strip until the plugs are engaged with or disengaged from their respective sockets.

It will further be understood that sockets 42 are electrically connected as necessary with the electrical components housed in support assembly 40. At the other end, conductors 38 branch away from fanning strip 36 for connection with transformer 26, or the reactor residing within enclosure 12 of power supply 10. By way of illustration only, FIG. 3 shows two output conductors 38 passing through a side wall of tank 12 by way of insulating bushings 32 and 34 to a junction box in housing 14.

Thus, it may be seen that fanning strip 36 provides a very effective means of electrically connecting support assembly 40 to other components within the power supply. It provides a centralized location for all electrical interconnections to support assembly 40 and allows simple, easy and quick means of disconnect from support assembly 40. In this manner, support assembly 40 may be isolated electrically from tank 12 in a simple fashion.

Now that the principles of the invention have been explained, it will be understood that many modifications may be made. For example, support assembly 40 may contain only one strut and a single pair of tubular supports. In a still further embodiment, two fanning strips may be provided and the number of plugs per strip may be reduced. Furthermore, the fanning strip may terminate in a connector, such as a socket type connector, and then be mated with another connector on the support assembly, such as a male-type connector.

What is claimed is:

1. In a high voltage DC power supply having a transformer and other electrical components housed within a tank containing fluid having at least one cover and one side wall with the transformer rigidly secured to the tank, an insulated support assembly detachably mounted in the tank comprising:
   a plurality of electrically insulated horizontal struts of substantially equal width forming a ladder arrangement carrying at least a major portion of said other electrical components;
   a plurality of electrically insulated vertical supports rigidly supporting each of said horizontal struts;
   elongated members extending through respective vertical supports for detachably securing together the struts and vertical supports into a unitary detachable rigid support structure,
   support structure means including shelf means removably secured to said elongated members and detachably securing said support assembly interiorly of said tank and away from said side wall whereby said support assembly is isolated electrically from the tank; and
   electrical coupling means detachably and electrically connecting said transformer to said other electrical components.

2. The high voltage DC power supply of claim 1 wherein said electrical coupling means comprises at least one horizontal flexible strap spanning substantially across a longitudinal dimension of one of said horizontal struts and a plurality of electrical conductors disposed within said strap, said electrical conductors terminating in a first connector positioned along said strap.

3. The high voltage DC power supply of claim 2 wherein said electrical coupling means includes a mating connector disposed colinearly along said longitudinal dimension of said one of said horizontal struts and in juxtaposition to said first connector.

4. The high voltage DC power supply of claim 3 wherein said one of said horizontal struts is an uppermost U-shaped strut, the struts forming a ladder configuration.

5. The high voltage DC power supply of claim 1 wherein said support assembly is longitudinally parallel to said wall and is laterally disposed between said shelf means and said electrical coupling means.

6. The high voltage DC power supply of claim 5 wherein said shelf means is adjacent a lower portion of said support assembly and said electrical coupling means is adjacent an upper portion of said support assembly.

7. The high voltage DC power supply of claim 1 wherein said shelf means includes a plurality of brackets secured to a wall of said tank, said brackets detachably holding said plurality of vertical supports.

8. The high voltage DC power supply of claim 7 wherein said plurality of brackets comprises a pair of horizontal flanges disposed adjacent opposite ends of said support assembly, said pair of horizontal flanges receiving a pair of said plurality of vertical supports.

9. The high voltage DC power supply of claim 8 wherein said pair of horizontal flanges are provided with holes for slidably engaging said pair of vertical supports, said pair of vertical supports protruding below said pair of horizontal flanges for detachably anchoring said support assembly in a vertical position within said tank.

10. The high voltage DC power supply of claim 5 wherein an uppermost strut of said plurality of horizontal struts is removably fastened to said wall for preventing said support assembly from pivoting away from a vertical position within said tank.

11. The high voltage DC power supply of claim 10 wherein said uppermost strut is removably fastened to said wall by a pair of metallic straps, said metallic straps forming horizontal bridges between said wall and said support assembly.

* * * * *